US007440811B2

(12) United States Patent  
Giebels et al.

(10) Patent No.: US 7,440,811 B2  
(45) Date of Patent: Oct. 21, 2008

(54) DYNAMIC-STATE WAITING TIME ANALYSIS METHOD FOR COMPLEX DISCRETE MANUFACTURING

(75) Inventors: Mark Mathieu Theodorus Giebels, Berkeley, CA (US); Daniel Conrad Benson, Berkeley, CA (US)

(73) Assignee: Siemens Aktiengesellschaft, Munich (DE)

( * ) Notice: Subject to any disclaimer, the term of this patent is extended or adjusted under 35 U.S.C. 154(b) by 207 days.

(21) Appl. No.: 11/083,825

(22) Filed: Mar. 18, 2005

(65) Prior Publication Data

US 2006/0079979 A1    Apr. 13, 2006

Related U.S. Application Data

(60) Provisional application No. 60/614,132, filed on Sep. 28, 2004.

(51) Int. Cl.  
*G06F 19/00* (2006.01)

(52) U.S. Cl. .......................... 700/100; 700/93; 700/102

(58) Field of Classification Search ............. 700/95, 700/97, 99, 100, 101, 102, 105, 106, 107, 700/108, 109, 93; 705/7, 8, 9, 10, 11; 702/84, 702/182, 183

See application file for complete search history.

(56) References Cited

U.S. PATENT DOCUMENTS

| | | | | |
|---|---|---|---|---|
| 5,914,891 | A | * | 6/1999 | McAdams et al. ............ 703/11 |
| 6,011,830 | A | * | 1/2000 | Sasin et al. ............. 379/10.03 |
| 6,216,118 | B1 | * | 4/2001 | Iokibe et al. .................. 706/12 |
| 6,532,421 | B2 | * | 3/2003 | Miwa ........................... 702/84 |
| 6,625,569 | B2 | * | 9/2003 | James et al. ................ 702/183 |
| 7,177,714 | B2 | | 2/2007 | Giebels et al. |
| 2005/0010383 | A1 | * | 1/2005 | Le Ravalec-Dupin et al. . 703/10 |
| 2005/0107904 | A1 | | 5/2005 | Mikata |
| 2006/0004620 | A1 | * | 1/2006 | Lee et al. ...................... 705/10 |
| 2006/0010017 | A1 | * | 1/2006 | Hase et al. ..................... 705/7 |

OTHER PUBLICATIONS

Manish K. Govil and Michael C. Fu, "Queueing Theory in Manufacturing: A Survey", Journal of Manufacturing Systems, 1999, vol. 18, No. 3, ABI/INFORM Global, pp. 214-240.

Govil M K et al: Queuing Theory in Manufacturing Systems, Society of Manufacturing Engineers, Dearborn, MI, US vol. 18, No. 3, 1999, pp. 214-240, XP004182932, ISSN: 0278-6125.

Miragliotta G, et al.: "Decentralized, Multi-Objective Driven Scheduling for Re-Entrant Shops: A Conceptual Development and a Test Case" European Journal of Operational Research, Amsterdam, NL, vol. 167, No. 3, Sep. 1, 2004, pp. 644-662, XP004750786, ISSN: 0377-2217.

(Continued)

*Primary Examiner*—Albert DeCady  
*Assistant Examiner*—Charles Kasenge

(57) ABSTRACT

A method of analyzing a manufacturing system. The manufacturing system includes a plurality of manufacturing resources. A set of orders is currently appointed for processing by the manufacturing system. Each order of the set of orders requires performance of at least one task. Each task is to be performed by at least a respective one of the manufacturing resources. The method includes determining stochastic parameters for each task of the plurality of tasks. The method also includes calculating a stochastic waiting time for at least one selected task of the plurality of tasks. The calculation is based at least in part on the stochastic parameters of the tasks.

29 Claims, 12 Drawing Sheets

OTHER PUBLICATIONS

Brennan R W, et al.: "Evaluating the Performance of Reactive Control Architectures for Manufacturing Production Control" Computers in Industry, Elsevier Science Publishers. Amsterdam, NL, vol. 46, No. 3, Oct. 2001, pp. 235-345, XP004308499, ISSN: 0166-3615.

Somlo J: "Suitable Switching Policies for FMS Scheduling" Mechatronics, Pergamon Press, Oxford, GB, vol. 14, No. 2., Mar. 2004, pp. 199-225, XP004464009, ISSN: 0957-4157.

Giebels, Mark, EctoPlan a Concept for Concurrent Manufacturing Planning and Control; Building Holarchies for Manufacturing-to-Order Environments, PrintPartners lpskamp B.V. Jun. 15, 2000.

Vijayan, Jaikumar, "Manufacturing Execution Systems", Computerworld, Jul. 31, 2000, Retrieved from Internet: URL: <http://www.computerworkd.com/printthis/2000/0,4814,47639,00.html.

Yi-Feng Hung, et al., "A Production Planning Approach based on Iterations of Linear Programming Optimization and Flow Time Prediction", Journal of the Chinese Institute of Industrial Engineers, vol. 18, No. 3, pp. 55-67 (2001).

Whitt, Ward, "The Queueing Network Analyzer", The Bell System Technical Journal, vol. 62, No. 9, Nov. 1983, pp. 2779-2814.

Bitran, Gabriel R., et al., "Multiproduct Queueing Networks with Deterministic Routing: Decomposition Approach and the Notion of Interference", Management Science, vol. 34, No. 1, Jan. 1988, pp. 75-100.

* cited by examiner

DYNAMIC-STATE WAITING TIME ANALYSIS METHOD FOR COMPLEX DISCRETE MANUFACTURING

CROSS-REFERENCE TO RELATED APPLICATION

This application claims priority under 35 U.S.C. § 119 to U.S. Provisional Patent Application Ser. No. 60/614,132, entitled "Dynamic-State Waiting Time Analysis Method for Complex Discrete Manufacturing", filed in the name of Giebels et al. on Sep. 28, 2004, the contents of which are hereby incorporated by reference in their entirety for all purposes.

BACKGROUND

The present disclosure relates to complex discrete manufacturing environments, and in particular to the analysis of waiting times for production tasks that correspond to multiple orders to be produced using shared resources.

The total duration, or lead time, of a production task in complex discrete manufacturing consists of the time the task must wait before it can begin processing (the waiting time) and the time the task actually takes for processing (the processing time). Complex discrete manufacturing refers to manufacturing to produce a relatively large number of orders of different kinds, where a significant number of orders require a considerable number of production tasks. In practice, waiting times are often much longer than processing times and therefore dominate the overall lead time of a production order made up of a number of different production tasks.

Waiting times result from conflicting demands from various tasks on shared manufacturing resources such as machine tools and human operators of machine tools, large lot sizes, and unpredictable changes in processing times and unpredictable changes in the times at which necessary raw materials or components arrive at the manufacturing plant. In a highly dynamic manufacturing environment with inherent uncertainties and variability, particularly in complex manufacturing, it can be very difficult to predict waiting times for all tasks. Instead, it is typical for production planners who use Manufacturing Resource Planning (MRP II) systems to resort to predefined fixed lead times that include extra waiting time to provide a cushion for process variability. However, this practice fails to consider that lead times depend on the actual load of the manufacturing plant. Consequently, this practice results in unnecessarily high estimates of lead times, high work in progress (WIP) levels, unnecessary overtime costs, and chaotic conditions on the shop floor.

In the case of a high-volume production line, waiting times can be estimated by using steady-state analysis queuing-network techniques. But steady state analysis is not applicable for estimating waiting times at manufacturing resources in a plant engaged in "high-mix" complex manufacturing because of the highly dynamic arrival times, lot sizes and processing times.

SUMMARY

Apparatus and methods are therefore presented for a system to analyze a manufacturing system.

According to some embodiments, a method, a system and an article of manufacture that includes a computer usable medium containing computer readable program code are provided to analyze a manufacturing system. The manufacturing system includes a plurality of manufacturing resources. A set of orders is currently appointed for processing by the manufacturing system. Each order of the set of orders requires performance of at least one task. Each task is to be performed by at least a respective one of the manufacturing resources. The system to analyze the manufacturing system includes a processor and a memory that is coupled to the processor and stores software instructions. The method steps and/or the steps performed by the processor and/or the steps called for by the computer readable program code include determining stochastic parameters for each task of the plurality of tasks, and calculating a stochastic waiting time for at least one selected task of the plurality of tasks. The calculation is based at least in part on the stochastic parameters of the tasks.

An order may be considered to be "appointed" for processing by the manufacturing system when the order has (a) been received, or (b) it is anticipated that the order will be or may be received.

"Determining a stochastic parameter" refers to calculating the stochastic parameter and/or receiving data that represents the stochastic parameter.

Further aspects of the instant system will be more readily appreciated upon review of the detailed description of the preferred embodiments included below when taken in conjunction with the accompanying drawings.

DETAILED DESCRIPTION OF SPECIFIC EMBODIMENTS

According to some embodiments, stochastic waiting times are calculated for every production task represented by the current mix of orders (possibly including anticipated orders) facing a manufacturing facility. The calculated stochastic waiting times reflect dynamic conditions, as represented by stochastic parameters used to characterize the production tasks. The stochastic parameters are indicative of the current order load as well potential conflicts among production tasks.

The calculated waiting times may be used to provide a more realistic picture of order lead times than conventional conservative waiting time assumptions. Moreover, the calculated waiting time information may be used as an input to support detection of potential bottlenecks. Another potential use of the calculated waiting times may be for exploring "what-if" scenarios to attempt to deal with likely problems in achieving time commitments for the current or proposed order mix. The calculated waiting times may further serve as an input to production planning systems.

Figure 1:
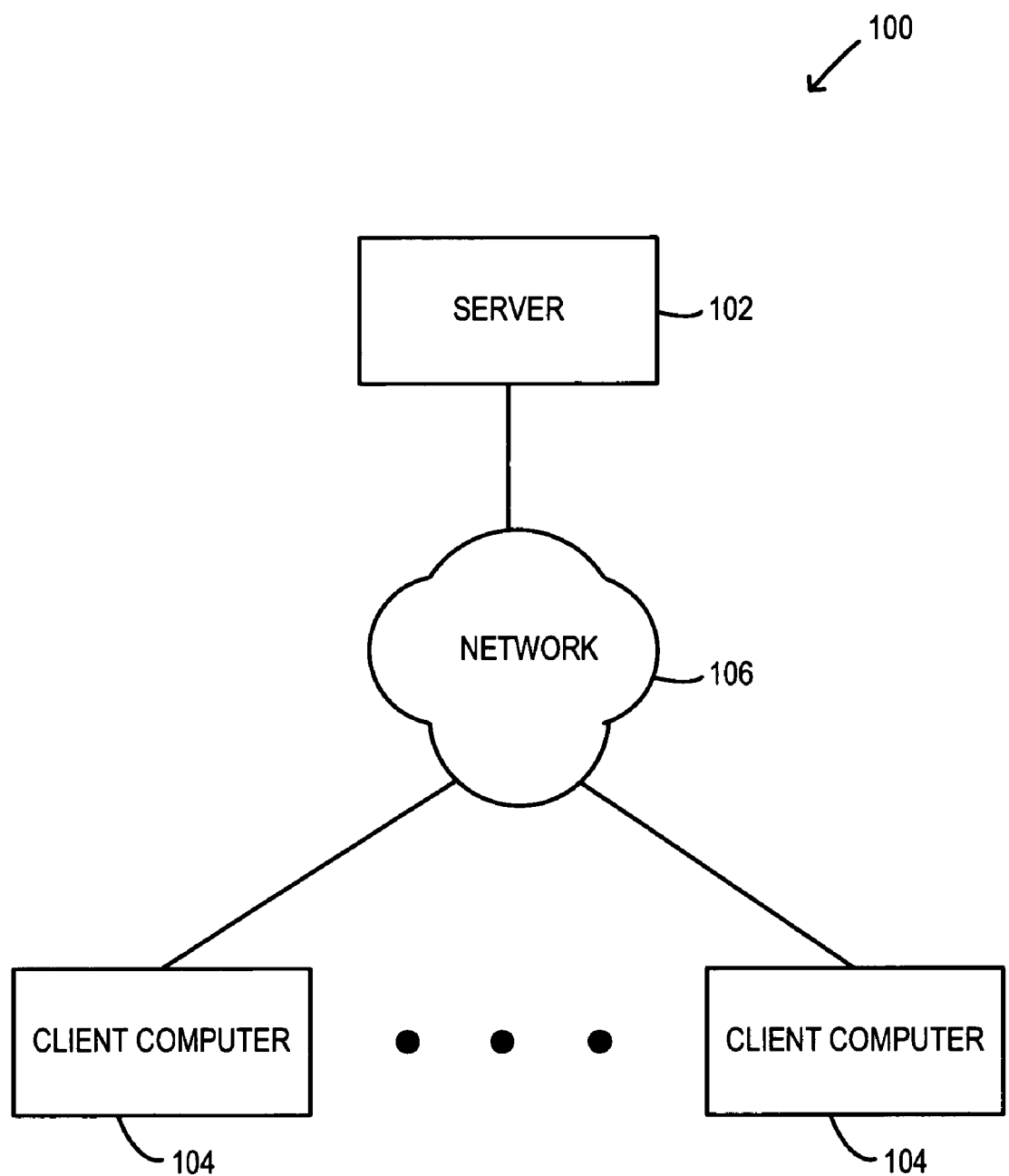
FIG. 1 is a block diagram of a data processing system provided according to some embodiments.

FIG. 1 is a block diagram of a data processing system 100 provided according to some embodiments. The data processing system 100 includes a server computer 102 and one or more client computers 104 coupled to the server computer 102 via a data communication network 106. In its hardware aspects, the data processing system 100 may be entirely conventional. Moreover, the data communication protocol by which data is exchanged between the server computer 102 and the client computers 104 may also be conventional. The data communication between the server computer 102 and the client computers 104 need not be continuous but rather may be intermittent or occasional.

Figure 2:
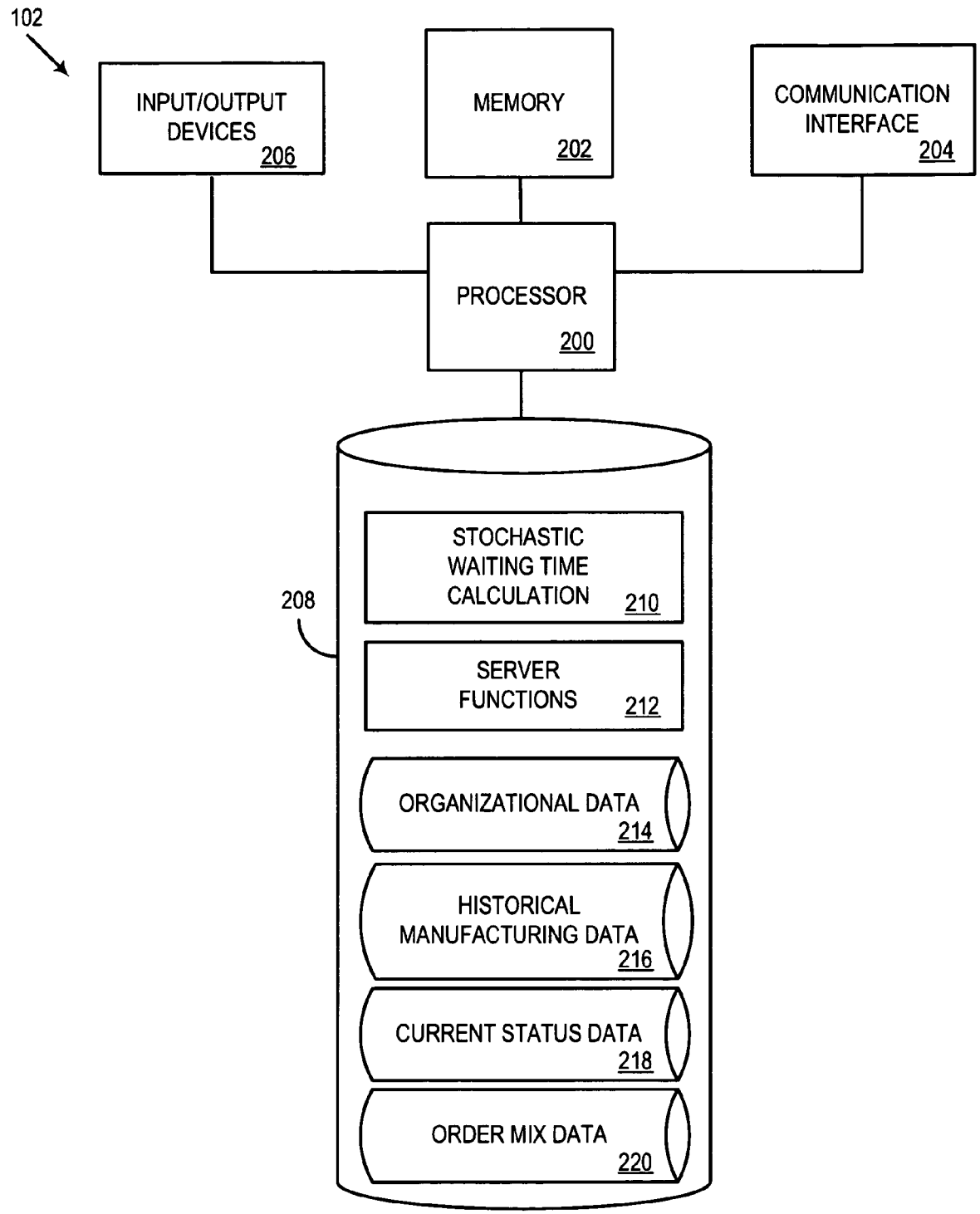
FIG. 2 is a block diagram of a server computer that is provided according to some embodiments as part of the data processing system of FIG. 1.

FIG. 2 is a block diagram of the server computer 102 as provided in accordance with some embodiments. As suggested above, the server computer 102 may, in some embodiments, be entirely conventional in terms of its hardware aspects. As discussed below, software may be provided to control the server computer 102 in accordance with aspects of the present invention, and data may be stored and manipulated in the server computer 102 in accordance with aspects of the present invention.

The server computer 102 may include one or more processors 200, which may be a conventional microprocessor or microprocessors. Also included in server computer 102 are memory 202, one or more communication interfaces 204, and input/output devices 206, all of which are in communication with the processor 200. The memory 202 may be, in some embodiments, one or more of RAM, ROM, flash memory, etc., and may serve as one or more of working memory, program storage memory, etc. The communication interfaces 204 allow the server computer 102 to exchange data with the client computers 104 (FIG. 1). The I/O devices 206 may include one or more conventional devices such as displays, printers, keyboards, a mouse, a trackball, etc.

Also included in the server 102, and in communication with the processor 200, is a mass storage device 208. Mass storage device 208 may be constituted by one or more magnetic storage devices, such as hard disks, one or more optical storage devices, and/or solid state storage. The mass storage 208 may store an application 210 which controls the server computer to perform calculations of stochastic waiting times for production tasks in accordance with principles of the present invention. The mass storage 208 may also store software 212 which enables the server computer 102 to perform its server functions relative to the client computers. In addition, other software, which is not represented in the drawing, may be stored in the mass storage 208, including operating system software and/or other applications that allow the server computer 102 to perform other functions in addition to the stochastic waiting time calculations to be described below.

Still further, the mass storage 208 may store organizational data 214, historical manufacturing data 216, current status data 218 and order mix data 220.

The organizational data 214 reflects static characteristics of the manufacturing plant, such as a census of machine tools, resource (machine tool) groupings, operator availability and static process flows.

The historical manufacturing data 216 may be received from a Manufacturing Execution System (MES), which is not shown, or another data collection system. The historical manufacturing data 216 may reflect previously executed production tasks that are used to model the process variability on the shop floor, the occurrence of allocations to alternative machine tools, the variability in arrival of raw materials, and the reliability of the resources. As an example of a portion of the historical manufacturing data 216, some of this data may indicate that the processing time used to produce a given product on a given machine tool can vary between 10 and 100 minutes, with a most likely value of 30 minutes.

The current status data 218 may reflect the current status of production tasks and resources on the shop floor. This data may also be received from the MES, and may define the starting point for the waiting time analysis.

The order mix data 220 may reflect the set of orders that is currently scheduled to be produced by the manufacturing plant. In addition to orders definitely received, the order mix data may, for at least some purposes, also include data that reflects anticipated orders, outstanding quotes, etc. The order mix data 220 may be received from an Enterprise Resource Planning (ERP) system, which is not shown, or from another planning system. This data may be deterministic, and may be combined with the historical manufacturing data 216 to produce stochastic representations of future production tasks.

The following Table 1 provides details of certain aspects of the data which was described above, as may be provided in accordance with some embodiments.

| Parameter | Abbreviation | Description | Stochastic Characteristics |
|---|---|---|---|
| Planned Earliest Start Time | PLEST | The planned earliest start time of a production task due to, for instance, arrival of materials defined in the BOM. | Any distribution or a deterministic value may be used |
| Bill of Materials | BOM | The required materials for executing the manufacturing tasks in the WBS | N/A |
| Work Breakdown Structure | WBS | An overview of the production tasks that need to be performed for a given production order and their precedence relations | Alternative routings and chance of occurrence may be included |
| Processing Time | PR | The expected total time a production task occupies its allocated machine tool(s) | Any distribution or a deterministic value may be used |
| Lead Time | LT | The expected time period between the start and end times of a production task | Any distribution or a deterministic value may be used |
| Order Due Date | ODD | The date and time a production order needs to be finished | Deterministic value |
| Task Resource Allocations | TRA | The set of resources allocated to execute a given production task. | The chance of actually using one of the resources from this set for |

-continued

| Parameter | Abbreviation | Description | Stochastic Characteristics |
|---|---|---|---|
| Resource Availability | RA | The expected availability of a resource for production in a given period of time | executing the production task may be included. Any distribution, function or deterministic value may be used |

Figure 3:
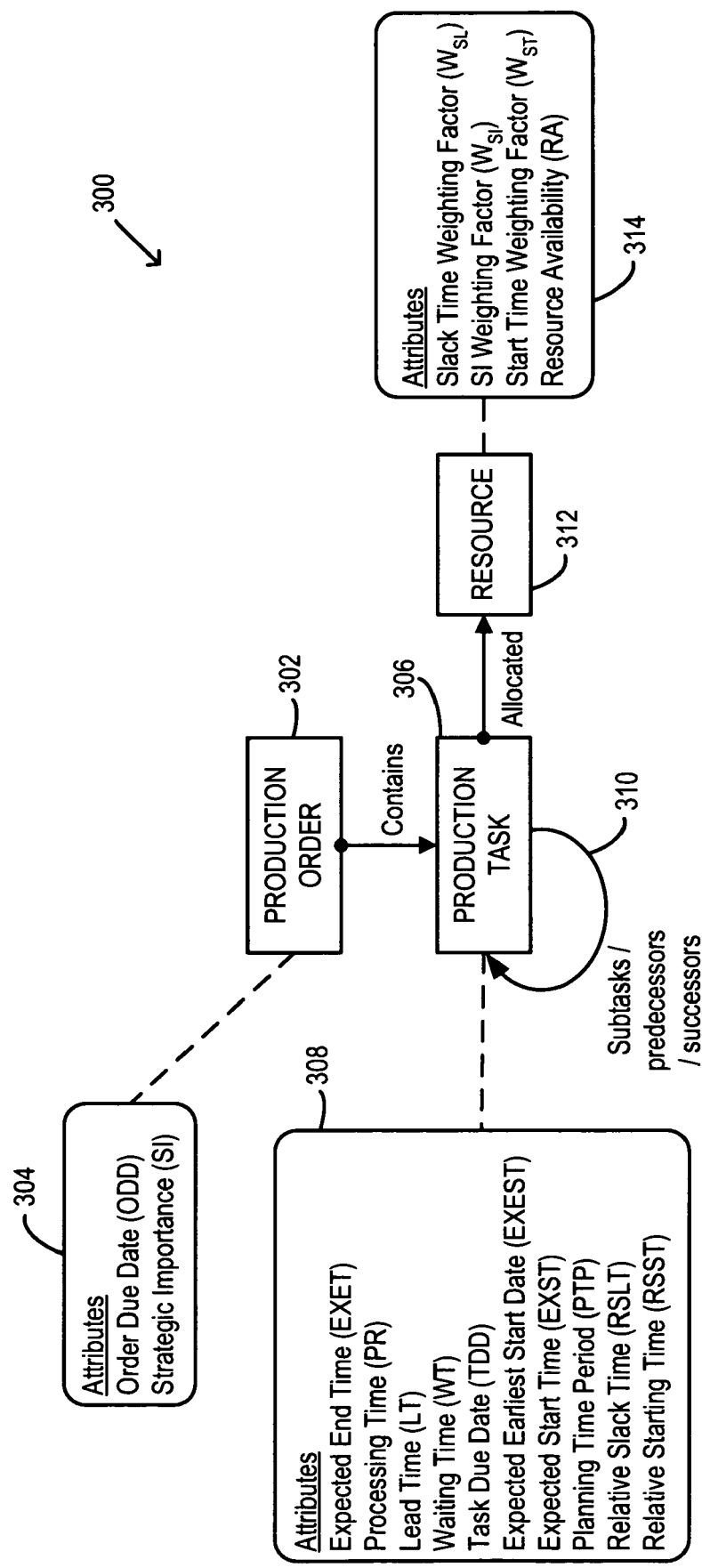
FIG. 3 is an illustration of an object-oriented data model used to program the server computer of FIG. 2 in accordance with some embodiments.

FIG. 3 is an illustration of an object-oriented data model 300 used to program the server computer 102 in accordance with some embodiments.

One type of object in the data model 300 is a production order object 302. The production order object 302 has attributes 304 that include order due date (ODD) and strategic importance (SI). The production order object 302 may have a relationship of containing one or more production task objects 306. The production task object 306 has attributes 308 that include expected end time (EXET), processing time (PR), lead time (LT), waiting time (WT), task due date (TDD), expected earliest start time (EXEST), expected start time (EXST), planning time period (PTP), relative slack time (RSLT) and relative starting time (RSTT). As indicated at 310, there may be associated with the production task object 306 one or more subtasks, predecessor tasks (i.e., tasks that must be completed before the production task begins) and successor tasks (i.e., tasks that cannot be started until the production task is completed). The production task object 306 may have a relationship of being allocated to one or more resource objects 312. The resource object 312 has attributes 314 that include slack time weighting factor ($W_{SL}$), strategic importance weighting factor ($W_{SI}$), start time weighting factor ($W_{ST}$) and resource availability (RA). Definitions and/or formulas or algorithms for calculating these attributes are described below. It is one aspect of the present invention to calculate the above mentioned waiting time attribute of the production task object 306 as a stochastic function.

The following Table 2 lists for each attribute the class of object having that attribute, the name of the attribute, the abbreviation used to refer to that attribute, a description of the attribute, the distribution function for that attribute and applicable constraints. In alternative embodiments other distribution functions can be used for at least some of the attributes.

| Object | Attribute | Abbreviation | Description | Distribution Function | Constraints |
|---|---|---|---|---|---|
| Production Order | Order Due Date | ODD | The date and time a production order needs to be finished | Deterministic | N/A |
| Production Order | Strategic Importance | SI | An indicator of the relative strategic importance of this production order, compared to the other production orders. | Deterministic | 0 < SI < 1 |
| Production Task | Expected End Time | EXET | The time the production task is expected to end according to the analysis | Triangular | EXET = EXST + LT |
| Production Task | Processing Time | PR | The expected total time a production task occupies its allocated machine tool(s) | Triangular | PR > 0 |
| Production Task | Lead Time | LT | The expected time period between the start and end times of a production task | Triangular | LT > 0 |
| Production Task | Waiting Time | WT | The time period between the expected earliest start time and the expected start time of a production task | Triangular | WT > 0 |
| Production Task | Task Due Date | TDD | The date and time a production task needs to be finished | Triangular | TDD = ODD − LT[critical path of the succeeding tasks] |
| Production Task | Expected Earliest Start Time | EXEST | The expected earliest start time of a production task according to the analysis | Triangular | EXEST >= EXET[preceding task] |
| Production Task | Expected Start Time | EXST | The time the production task is expected to start according to the analysis | Triangular | EXST = EXEST + WT |

-continued

| Object | Attribute | Abbreviation | Description | Distribution Function | Constraints |
|---|---|---|---|---|---|
| Production Task | Planning Time Period | PTP | The time period in which the production task will be executed, i.e. from the lower bound value of the EXEST until the upper bound value of the TDD. | N/A | N/A |
| Production Task | Relative Slack Time | RSLT | Relative unplanned time period (slack time) between the task due date (TDD) and the expected earliest start time (EXEST) of the task | Triangular | $0 < RSLT < 1$ |
| Production Task | Relative Starting Time | RSTT | Relative starting time of the task between the task due date (TDD) and the expected earliest start time (EXEST) of the task | Triangular | $0 < RSST < 1$ |
| Production Task | Priority | Pr | The priority of the task relative to competing tasks | Triangular | $0 < Pr < 3$ |
| Resource | Slack Time Weighting Factor | $W_{SL}$ | The weighting factor used in the analysis to vary the impact of the remaining slack time on the priority setting | Deterministic | $0 < W_{SL} < 1$ |
| Resource | SI Weighting Factor | $W_{SI}$ | The weighting factor used in the analysis to vary the impact of the strategic importance (SI) on the priority setting | Deterministic | $0 < W_{SI} < 1$ |
| Resource | Start Time Weighting Factor | $W_{ST}$ | The weighting factor used in the analysis to vary the impact of the expected start time (EXST) on the priority setting | Deterministic | $0 < W_{ST} < 1$ |
| Resource | Resource Availability | RA | The expected availability of a resource for production in a given period of time | Function (time) | $RA > 0$ |

In one embodiment, a triangular probability density function is used for many of the stochastic parameters, using the minimum, most likely and maximum parameter values. However, other density functions may be used, and in such cases the standard deviation may be used to determine the lower and upper bounds of the parameter values.

Figure 4:
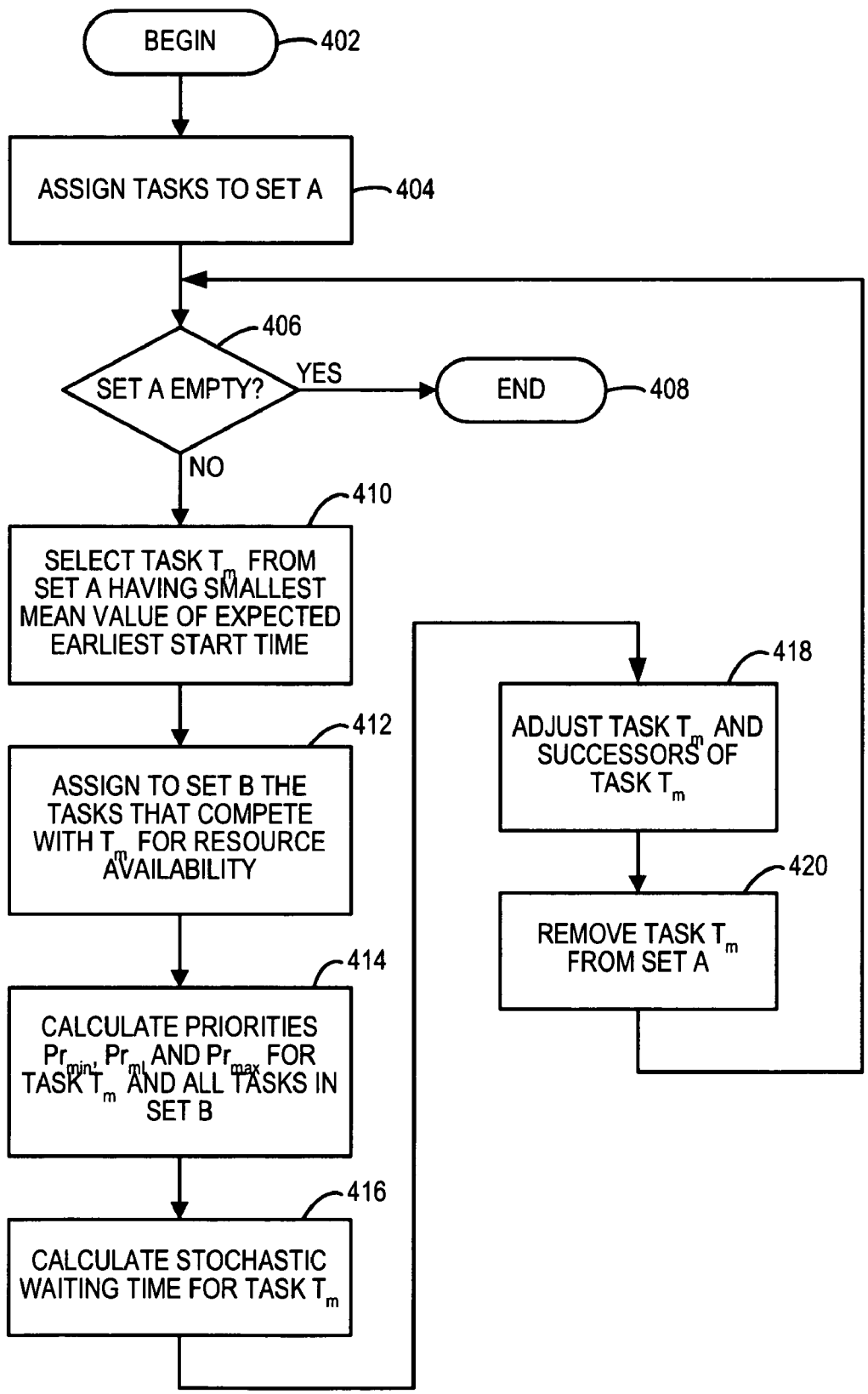
FIG. 4 is a flow chart that illustrates a process performed by the server computer of FIG. 2 in accordance with some embodiments.

The dynamic-state waiting time calculations performed in accordance with the invention may aid in determining the amount of delay production tasks are likely to face due to resource constraints based on the amount of "traffic" generated by the current order mix. FIG. 4 is a high-level flow chart that illustrates a process provided in accordance with the invention to perform a calculation of stochastic expected waiting time for a set of production tasks for which stochastic parameters have been determined and/or are determined as part of the process.

The process of FIG. 4 begins at 402 and advances to 404, in which the production tasks for which waiting times are to be calculated are assigned as elements to a set A. In some cases the tasks assigned to set A may be all of the yet-to-be performed production tasks for every order in the current order mix. In other cases, the tasks assigned to set A may be all of the yet-to-be performed production tasks for a single order. Other groups of production tasks may alternatively be assigned to set A.

A decision block 406 ends (408) the process of FIG. 4 when the set A is empty, i.e., after waiting times have been calculated for all of the tasks originally included in set A.

If it is determined at 406 that at least one production task is in set A, then a task, designated now as task $T_m$, is selected from set A, as indicated at 410. The task to be selected may be the one having the smallest mean value of EXEST. The mean value of EXEST is calculated as the arithmetic mean of the minimum (earliest), maximum (latest) and most likely values of EXEST. It will be recalled from Table 2 that EXEST is represented as a stochastic function (e.g., a triangular probability density function having minimum, most likely, and maximum values).

Figure 5:
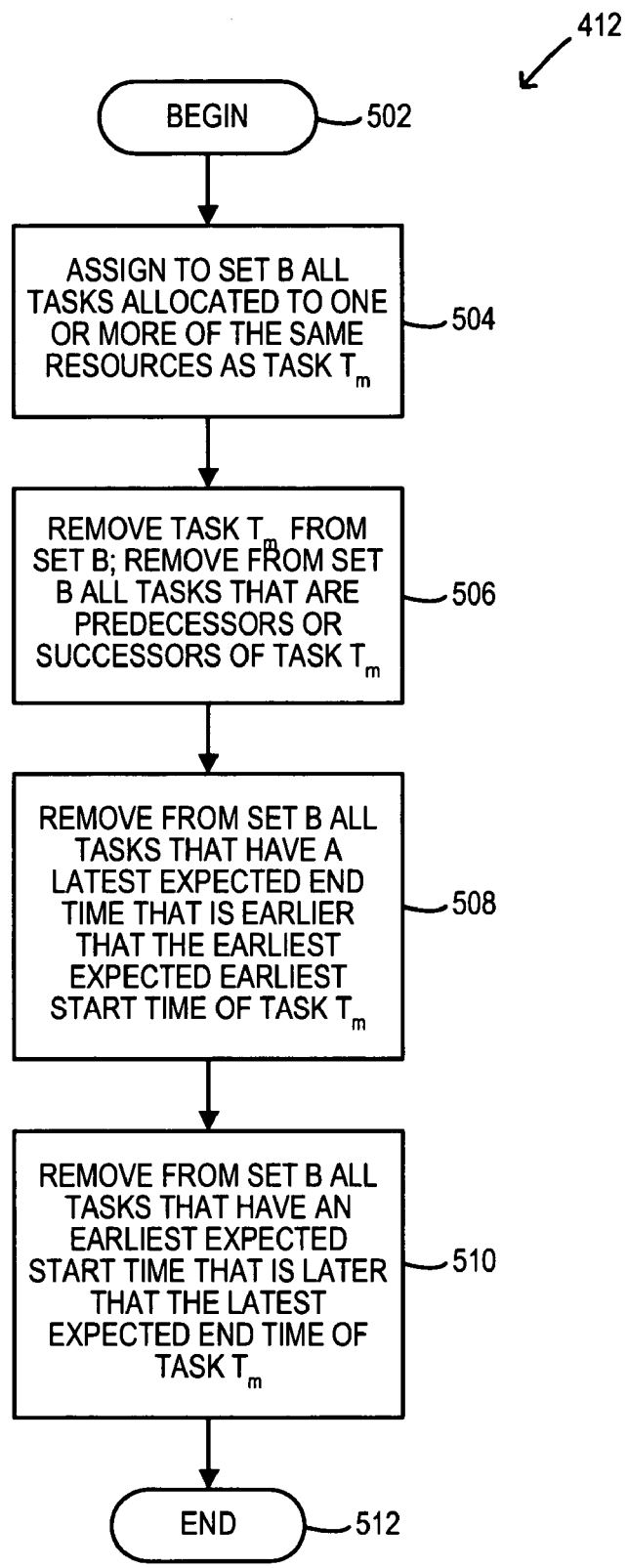
FIG. 5 is a flow chart that illustrates some details of the process of FIG. 4.

Next, at 412, there are assigned as elements of a set B all tasks that potentially conflict with (i.e, compete for resource availability with) task $T_m$. FIG. 5 is a flow chart that illustrates details of step 412. The process of FIG. 5 begins at 502 and advances to 504 at which there are assigned as elements of set B all tasks allocated to one or more of the same resources as task $T_m$. Next, at 506, task $T_m$ is removed from set B, and in addition all tasks that are predecessor or successor tasks of task $T_m$ are removed from set B at 506.

Then, at 508 there are removed from set B all tasks that have a maximum value of EXET that is earlier that the minimum value of EXEST of task $T_m$. That is, at step 508 there are eliminated from set B all tasks for which the latest possible time of completion is before the earliest possible time for starting task $T_m$.

Next, at 510 there are removed from set B all tasks that have a minimum value of EXEST that is later than the maximum value of EXET of task $T_m$. That is, at step 510 there are eliminated from set B all tasks for which the earliest possible time for starting is after the latest possible time of completion of task $T_m$. The process of FIG. 5 then ends (512) with set B containing all and only tasks that potentially conflict with task $T_m$.

Figure 6:
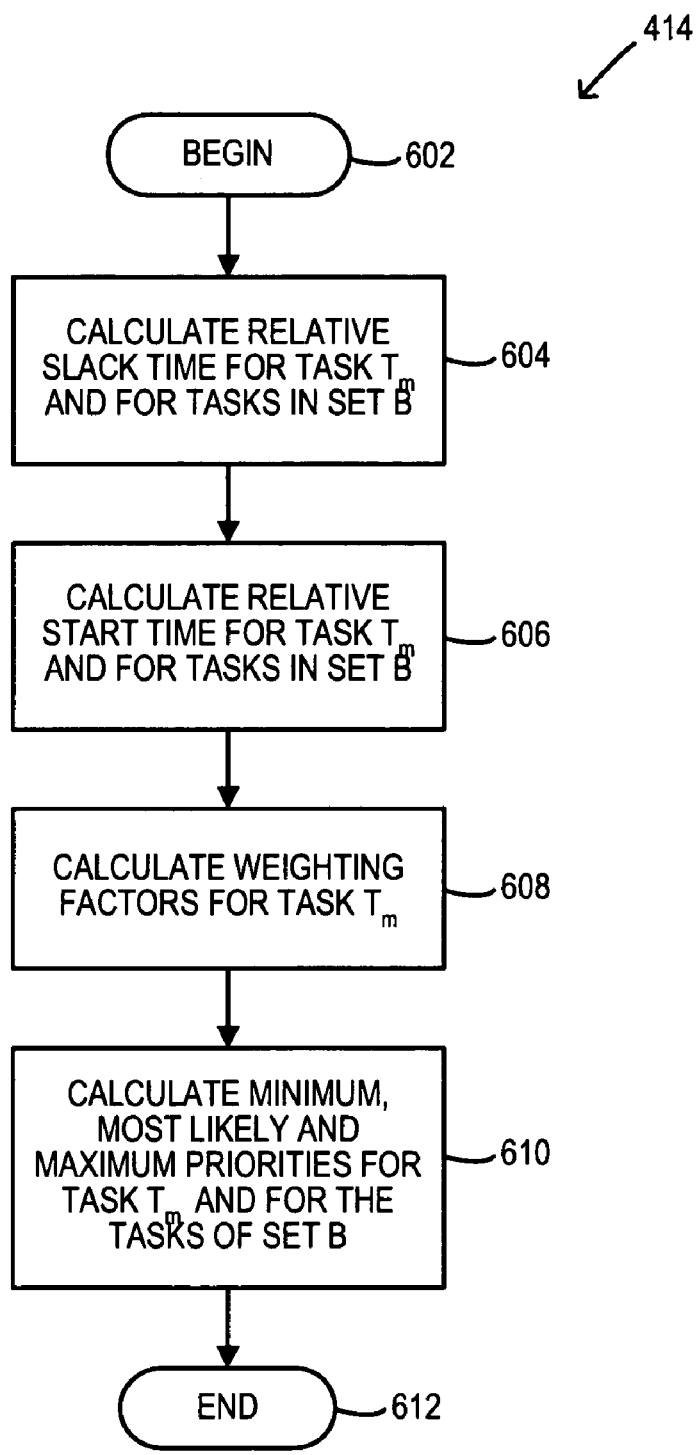
FIG. 6 is a flow chart that illustrates some details of the process of FIG. 4.

Referring again to FIG. 4, stochastic priorities are then calculated for task $T_m$ and for all tasks contained in set B, as indicated at 414. This is done to determine the likelihood that task $T_m$ will have to wait for one of its potential conflicting tasks. The stochastic priorities each include a minimum value $Pr_{min}$, a most likely value $Pr_{ml}$ and a maximum value $Pr_{max}$. FIG. 6 is a flow chart that illustrates details of step 414.

The process of FIG. 6 begins at 602 and advances to 604, at which RSLT is calculated for task $T_m$ and for each task included in set B. RSLT (relative slack time) is a parameter with a value between 0 and 1 and represents the relative unplanned time period (slack time) between the task due date (TDD) and the expected earliest start time (EXEST) of the task. For the RSLT a minimum value or lower bound (RSLT$_{lower}$), a most likely value (RSLT$_{ml}$) and a maximum value or upper bound (RSLT$_{upper}$) are calculated according to the following equations. Thus RSLT is a stochastic parameter.

$$RSLT_{lower} = \left(1 - \frac{TDD_{upper} - EXEST_{lower} - LT_{mean}}{TDD_{upper} - EXEST_{lower}}\right) \quad \text{(Eq. 1)}$$

$$RSLT_{ml} = \left(1 - \frac{TDD_{ml} - EXEST_{ml} - LT_{mean}}{TDD_{ml} - EXEST_{ml}}\right) \quad \text{(Eq. 2)}$$

$$RSLT_{upper} = \left(1 - \frac{TDD_{lower} - EXEST_{upper} - LT_{mean}}{TDD_{lower} - EXEST_{upper}}\right). \quad \text{(Eq. 3)}$$

Next, at 606, the RSTT is calculated for task $T_m$ and for each task included in set B. RSTT (relative start time) is a parameter with a value between 0 and 1 and represents the relative starting time of the task between the task due date (TDD) and the earliest expected start time (EXEST) of the task. For the RSTT a minimum value or lower bound (RSTT$_{lower}$), a most likely value (RSTT$_{ml}$) and a maximum value or upper bound (RSTT$_{upper}$) are calculated according to the following equations. Thus RSTT is a stochastic parameter.

$$RSTT_{lower} = \left(1 - \frac{EXST_{upper} + \left(\frac{LT_{mean} - PR_{mean}}{2}\right) - EXEST_{lower}}{TDD_{upper} - EXEST_{lower}}\right) \quad \text{(Eq. 4)}$$

$$RSTT_{ml} = \left(1 - \frac{EXST_{ml} + \left(\frac{LT_{mean} - PR_{mean}}{2}\right) - EXEST_{lower}}{TDD_{upper} - EXEST_{lower}}\right) \quad \text{(Eq. 5)}$$

$$RSTT_{upper} = \left(1 - \frac{EXST_{lower} + \left(\frac{LT_{mean} - PR_{mean}}{2}\right) - EXEST_{lower}}{TDD_{upper} - EXEST_{lower}}\right) \quad \text{(Eq. 6)}$$

Then, at 608, weighting factors $W_{SL}$, $W_{ST}$ and $W_{SI}$ are calculated for task $T_m$ according to the following equations. The weighting factors depend on the resources allocated to task $T_m$.

$$W_{SL} = \frac{\sum_{r=R_1}^{R_n} W_{SL_r} \cdot P(r)}{n} \quad \text{(Eq. 7)}$$

$$W_{ST} = \frac{\sum_{r=R_1}^{R_n} W_{ST_r} \cdot P(r)}{n} \quad \text{(Eq. 8)}$$

$$W_{SI} = \frac{\sum_{r=R_1}^{R_n} W_{SI_r} \cdot P(r)}{n} \quad \text{(Eq. 9)}$$

Where:
n is the number of resources allocated to task $T_m$,
R is the set of n resources allocated to task $T_m$,
$W_{SL\,r}$, $W_{ST\,r}$, $W_{SI\,r}$ are the weighting factors for SL, ST and SI on resource r, respectively
P(r) is the chance of allocation of resource r to task $T_m$.

At 610, $Pr_{min}$, $Pr_{ml}$ and $Pr_{max}$ are calculated for $T_m$ and for the tasks included in set B according to the following equations, using the results of steps 604, 606, 608. The process of FIG. 6 then ends (612), indicating completion of step 414 (FIG. 4).

$$Pr_{min} = W_{SL} \cdot RSLT_{lower} + W_{ST} \cdot RSTT_{lower} + W_{SI} \cdot SI \quad \text{(Eq. 10)}$$

$$Pr_{ml} = W_{SL} \cdot RSLT_{ml} + W_{ST} RSTT_{ml} + W_{SI} \cdot SI \quad \text{(Eq. 11)}$$

$$Pr_{max} = W_{SL} \cdot RSLT_{upper} + W_{ST} \cdot RSTT_{upper} + W_{SI} \cdot SI \quad \text{(Eq. 12)}$$

SI is a value that represents the relative strategic importance of the production order which contains the task in question as compared to other production orders.

Figure 7A:
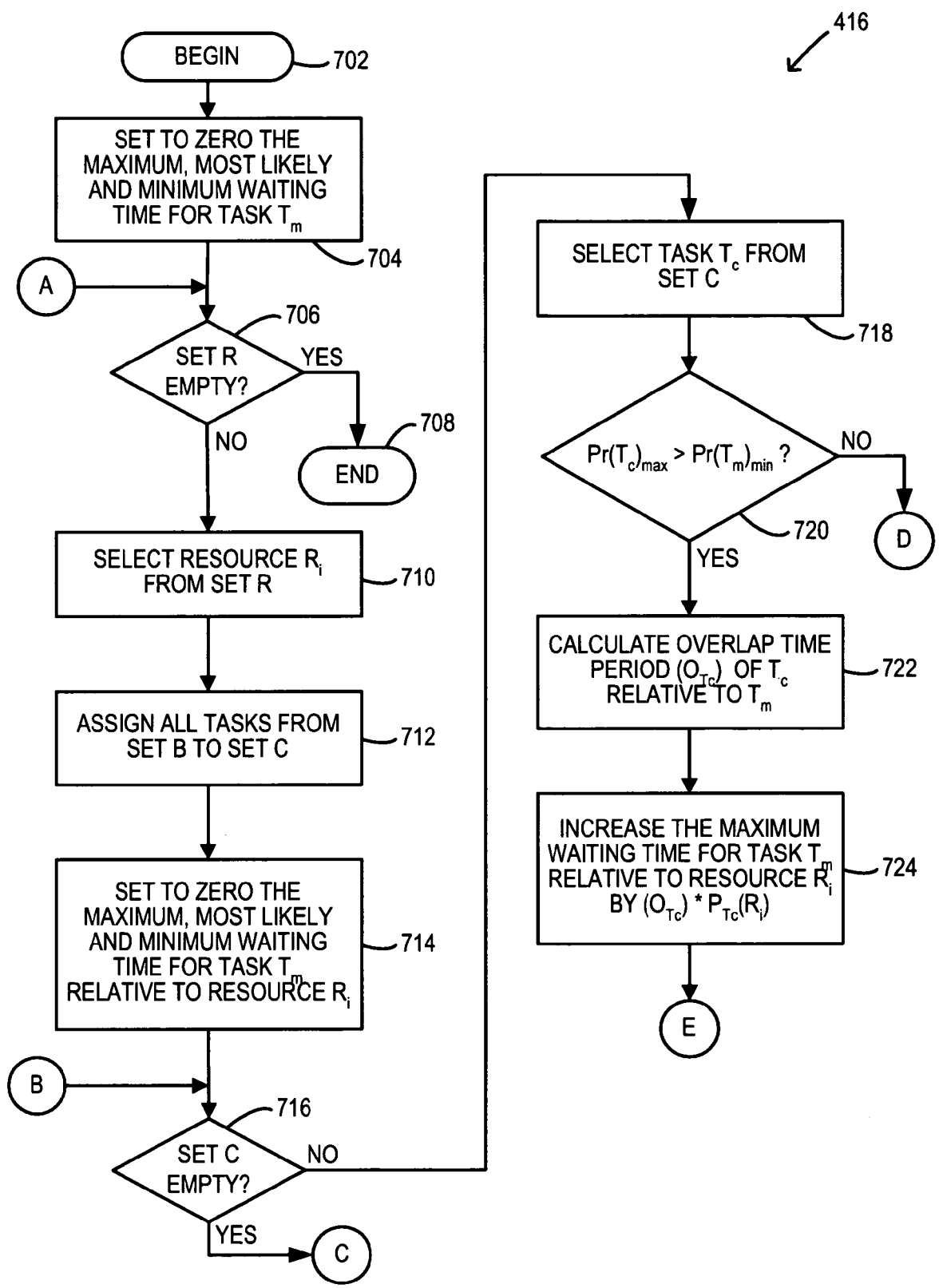
FIGS. 7A-7C together form a flow chart that illustrates some details of the process of FIG. 4.
Figure 7B:
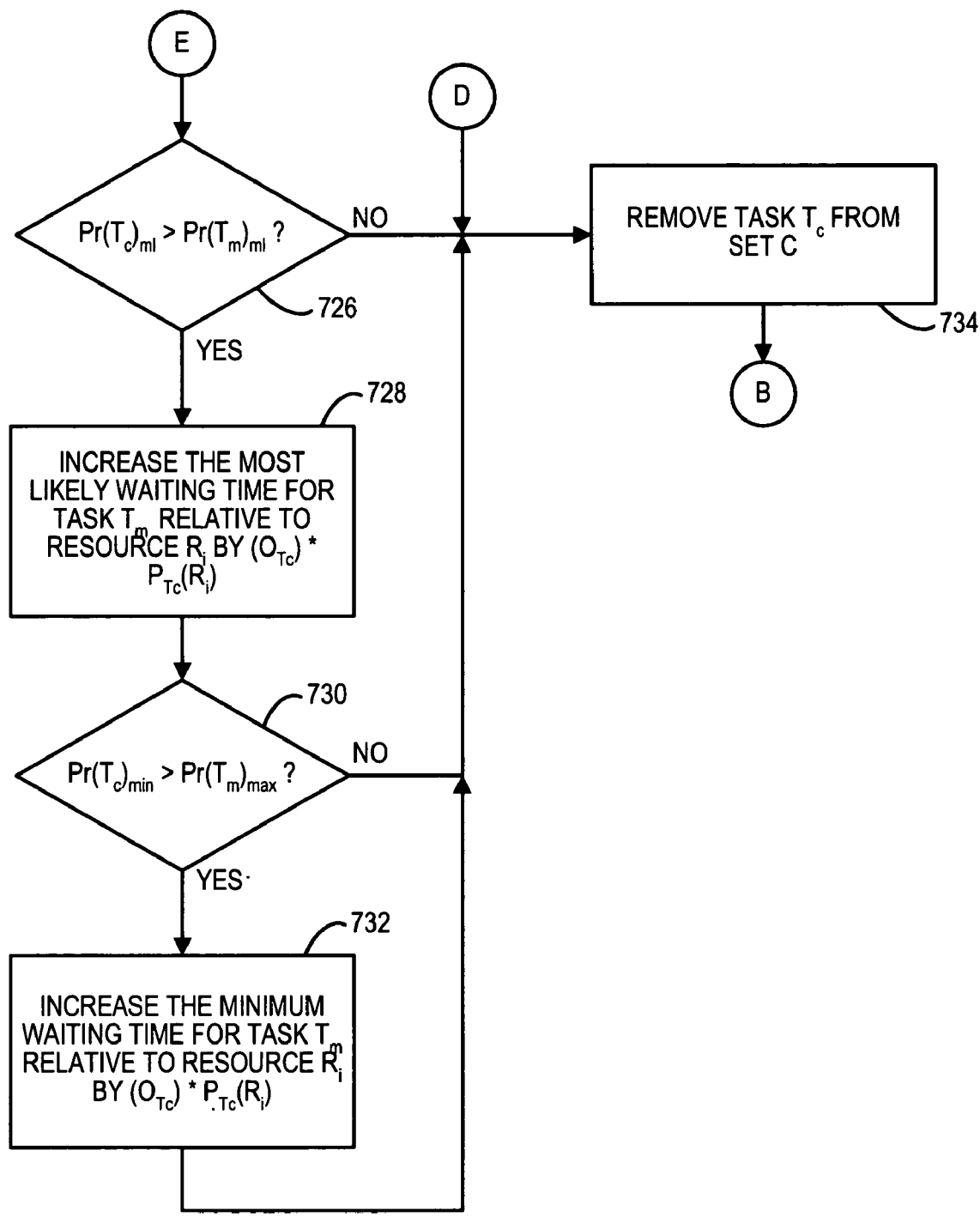
Figure 7C:
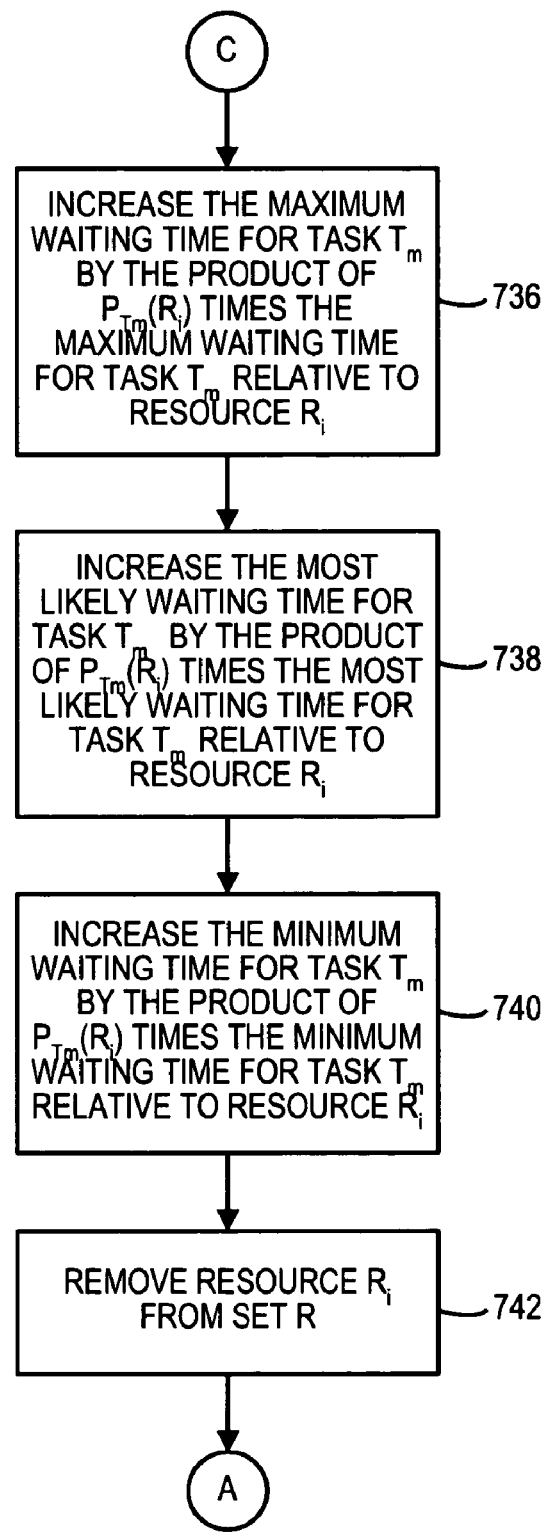

Referring again to FIG. 4, at 416 a stochastic waiting time for task $T_m$ is calculated. FIGS. 7A to 7C together form a flow chart that illustrates details of step 416.

The process of FIGS. 7A-7C begins at 702 and advances to 704. At 704 the following parameters, which are to be the outputs of the process, are initially set to zero: the lower bound (minimum value), the most likely value and the upper bound (maximum value) of the stochastic waiting time for the task $T_m$. Next a decision block 706 determines whether set R is empty. Set R initially contains all manufacturing resources (each represented by a resource object 312, FIG. 3) to which task $T_m$ is allocated. Upon the set R being found to be empty the process of FIGS. 7A-7C ends (708).

If it is found at 706 that set R currently includes at least one resource, a resource is selected from set R and is designated resource $R_i$, as indicated at 710. Next, at 712, all tasks included in set B (see FIG. 5 and step 412, FIG. 4) are assigned to be elements of a set C. Then, at 714, the following parameters are set to zero: the lower bound (minimum value), the most likely value and the upper bound (maximum value) of the stochastic waiting time for the task $T_m$ relative to the resource $R_i$.

Following 714, a decision block 716 determines whether set C is empty. If not, then 718 follows. At 718, a task is selected from set C and is designated $T_c$. Then, a decision block 720 determines whether the maximum value of the stochastic priority parameter for task $T_c$ ($Pr(T_c)_{max}$) exceeds the minimum value of the stochastic priority parameter for task $T_m$ ($Pr(T_m)_{min}$). If so, then 722 follows. At 722 an overlap time period ($O_{Tc}$) is calculated relative to tasks $T_c$ and $T_m$.

The formula used to calculate $O_{Tc}$ may vary depending on the relationship between the stochastic timings of tasks $T_c$ and $T_m$. Each of FIGS. 8A-8E illustrates a respective case for which a different formula for $O_{Tc}$ may be used. In each of FIGS. 8A-8E, task $T_m$ is represented as a bar that starts in time at the mean value of EXEST for task $T_m$ and ends at the mean value of EXET for task $T_m$. In each of FIGS. 8A-8E, task $T_c$ is represented as a bar that starts in time at the mean value of EXST for task $T_c$ and ends at the mean value of EXET for task $T_c$. In the case of each of the parameters EXEST, EXST and EXET, the mean value may be calculated as the arithmetic mean of the minimum, maximum and most likely values of the parameter. (In some embodiments, a value of EXEST, EXST and/or EXET other than the mean value may be used.)

Figure 8A:
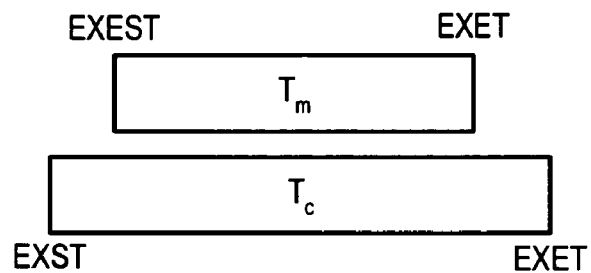
FIGS. 8A-8E schematically illustrate various cases applicable to calculation of an overlap time period relative to two potentially conflicting production tasks.

FIG. 8A illustrates the case in which the mean EXEST of task $T_m$ falls after the mean EXST of task $T_c$ and the mean EXET of task $T_m$ falls before the mean EXET of task $T_c$. In this case $O_{Tc}$ may be calculated according to the following equation:

$$O_{Tc} = PR_{Tc} * ((EXET_{Tm} - EXEST_{Tm})/LT_{Tc}) \quad \text{(Eq. 13)}$$

Figure 8B:
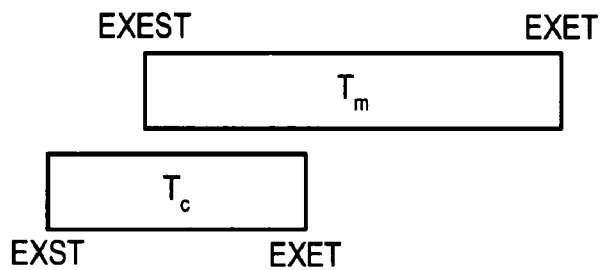

FIG. 8B illustrates the case in which the mean EXEST of task $T_m$ falls after the mean EXST of task $T_c$ and the mean EXET of task $T_m$ falls after the mean EXET of task $T_c$. In this case $O_{Tc}$ may be calculated according to the following equation:

$$O_{Tc} = PR_{Tc} * ((EXET_{Tc} - EXEST_{Tm})/LT_{Tc}) \quad \text{(Eq. 14)}$$

Figure 8C:
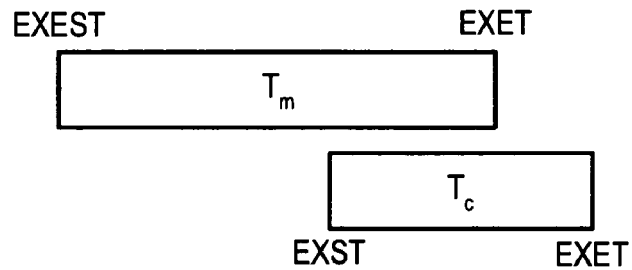

FIG. 8C illustrates the case in which the mean EXEST of task $T_m$ falls before the mean EXST of task $T_c$ and the mean EXET of task $T_m$ falls before the mean EXET of task $T_c$. In this case $O_{Tc}$ may be calculated according to the following equation:

$$O_{Tc} = PR_{Tc} * ((EXET_{Tm} - EXEST_{Tc})/LT_{Tc}) \quad \text{(Eq. 15)}$$

Figure 8D:
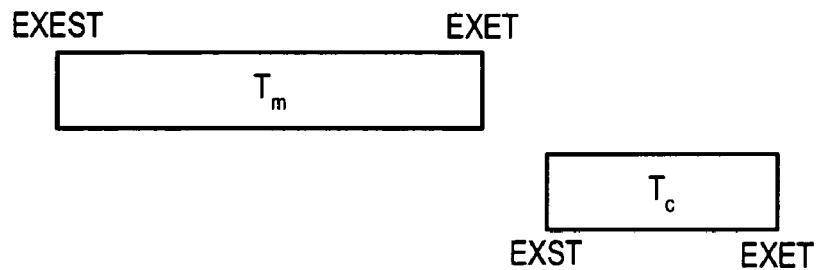

FIG. 8D illustrates a case of non-overlap between tasks $T_c$ and $T_m$; that is, the mean EXET of task $T_m$ falls before the mean EXST of task $T_m$. In this case, and in the other non-overlap case (not illustrated) where the mean EXET of task $T_c$ falls before the mean EXEST of task $T_m$, $O_{Tc} = 0$.

Figure 8E:
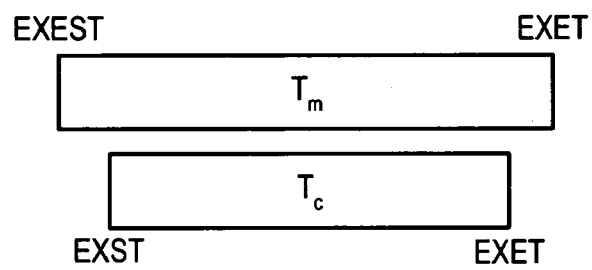

FIG. 8E illustrates the case in which the mean EXEST of task $T_m$ falls before the mean EXST of task $T_c$ and the mean EXET of task $T_m$ falls after the mean EXET of task $T_c$. In this case $O_{Tc} = PR_{Tc}$.

(In all of the above cases of calculating $O_{Tc}$, mean values of the parameters may be used. In some embodiments, a value of EXEST, EXST and/or EXET other than the mean value may be used.)

Referring once more to FIG. 7A, at 724 the maximum value of the waiting time for task $T_m$ relative to resource $R_i$ is increased by the product $O_{Tc} * P_{Tc}(R_i)$, where $P_{Tc}(R_i)$ is the likelihood that resource $R_i$ will be used by task $T_c$.

After 724 a decision block 726 (FIG. 7B) determines whether the most likely value of the stochastic priority parameter for task $T_c$ ($Pr(T_c)_{ml}$) exceeds the most likely value of the stochastic priority parameter for task $T_m$ ($Pr(T_m)_{ml}$). If so, 728 follows. At 728, the most likely value of the waiting time for task $T_m$ relative to resource $R_i$ is increased by the product $OT_c * P_{Tc}(R_i)$.

After 728 a decision block 730 determines whether the minimum value of the stochastic priority parameter for task $T_c$ ($Pr(T_c)_{min}$) exceeds the maximum value of the stochastic priority parameter for task $T_m$ ($Pr(T_m)_{max}$). If so, 732 follows. At 732, the minimum value of the waiting time for task $T_m$ relative to resource $R_i$ is increased by the product $O_{Tc} * P_{Tc}(R_i)$.

Following 732, task $T_c$ is removed from set C (as indicated at 734) and the process of FIGS. 7A-7C loops back to decision block 716 (FIG. 7A).

Considering again decision block 730 (FIG. 7B), if a negative determination is made at that point, the process advances directly from 730 to 734, so that 732 is skipped. Considering again decision block 726, if a negative determination is made at that point, the process advances directly from 726 to 734, so that 728 and 730 are skipped. Considering again decision block 720 (FIG. 7A), if a negative determination is made at that point, the process advances directly from 720 to 734, so that all of 722, 724 and 726 are skipped.

Considering again decision block 716 (FIG. 7A), if a positive determination is made at that point (i.e., if set C is found now to be empty, since the competing task loop—718 to 734—has been performed with respect to every task originally included in set C), then the process advances from 716 to 736 (FIG. 7C). At 736 the maximum value of the stochastic waiting time for task $T_m$ is increased by an amount equal to a product formed by multiplying the maximum value of the stochastic waiting time for task $T_m$ relative to resource $R_i$ by $P_{Tm}(R_i)$, which is the likelihood that resource $R_i$ will be used for processing task $T_m$. At 738 the most likely value of the stochastic waiting time for task $T_m$ is increased by an amount equal to a product formed by multiplying the most likely value of the stochastic waiting time for task $T_m$ relative to resource $R_i$ by $P_{Tm}(R_i)$. At 740, the minimum value of the stochastic waiting time for task $T_m$ is increased by an amount equal to a product formed by multiplying the minimum value of the stochastic waiting time for task $T_m$ relative to resource $R_i$ by $P_{Tm}(R_i)$.

Then, at 742, resource $R_i$ is removed from set R, and the process of FIGS. 7A-7C loops back to decision block 706 (FIG. 7A). As noted before, the process of FIGS. 7A-7C ends (708) if a positive determination is made at 706; i.e., if it is determined that the "resource loop" formed of steps 710 through 742 (in which the above-described competing task loop is nested) has been performed with respect to every resource that was originally included in set R.

Figure 10A:
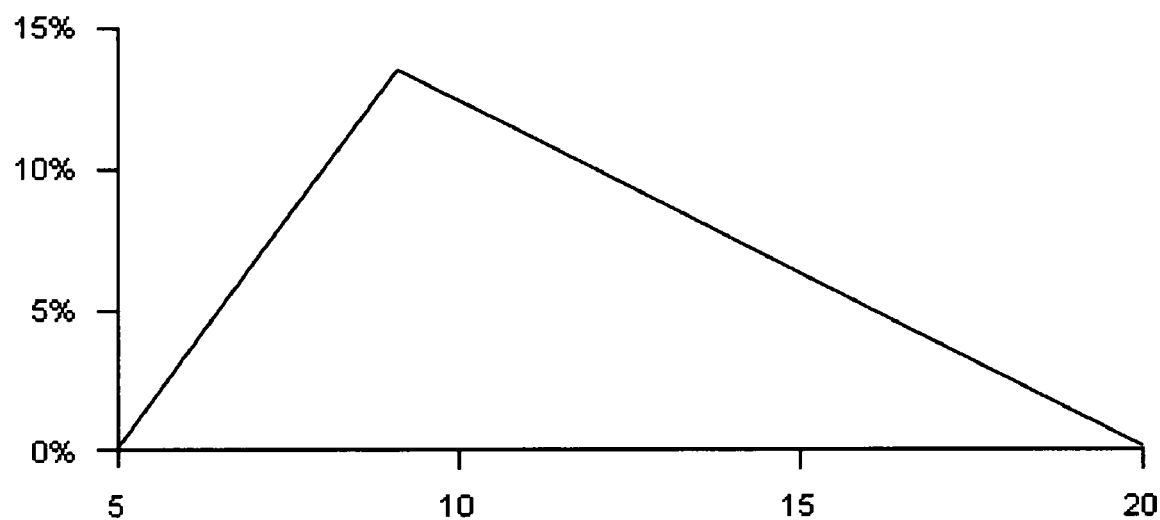
FIG. 10A graphically illustrates a triangular probability density function that may be applied to fit waiting time estimation values produced by the process of FIGS. 4-9.
Figure 10B:
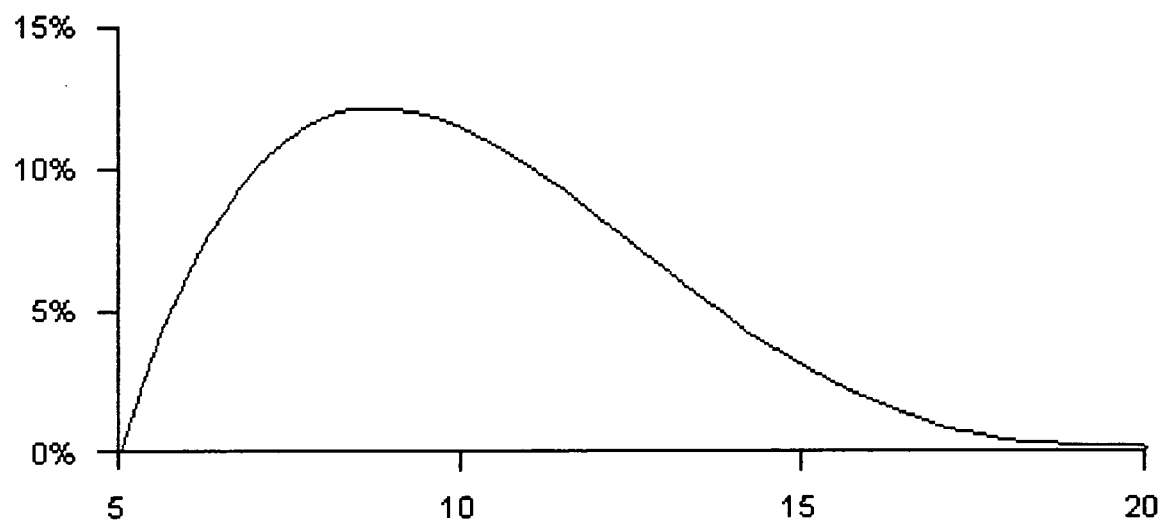
FIG. 10B graphically illustrates a beta probability density function that may be applied to fit waiting time estimation values produced by the process of FIGS. 4-9.
Figure 9:
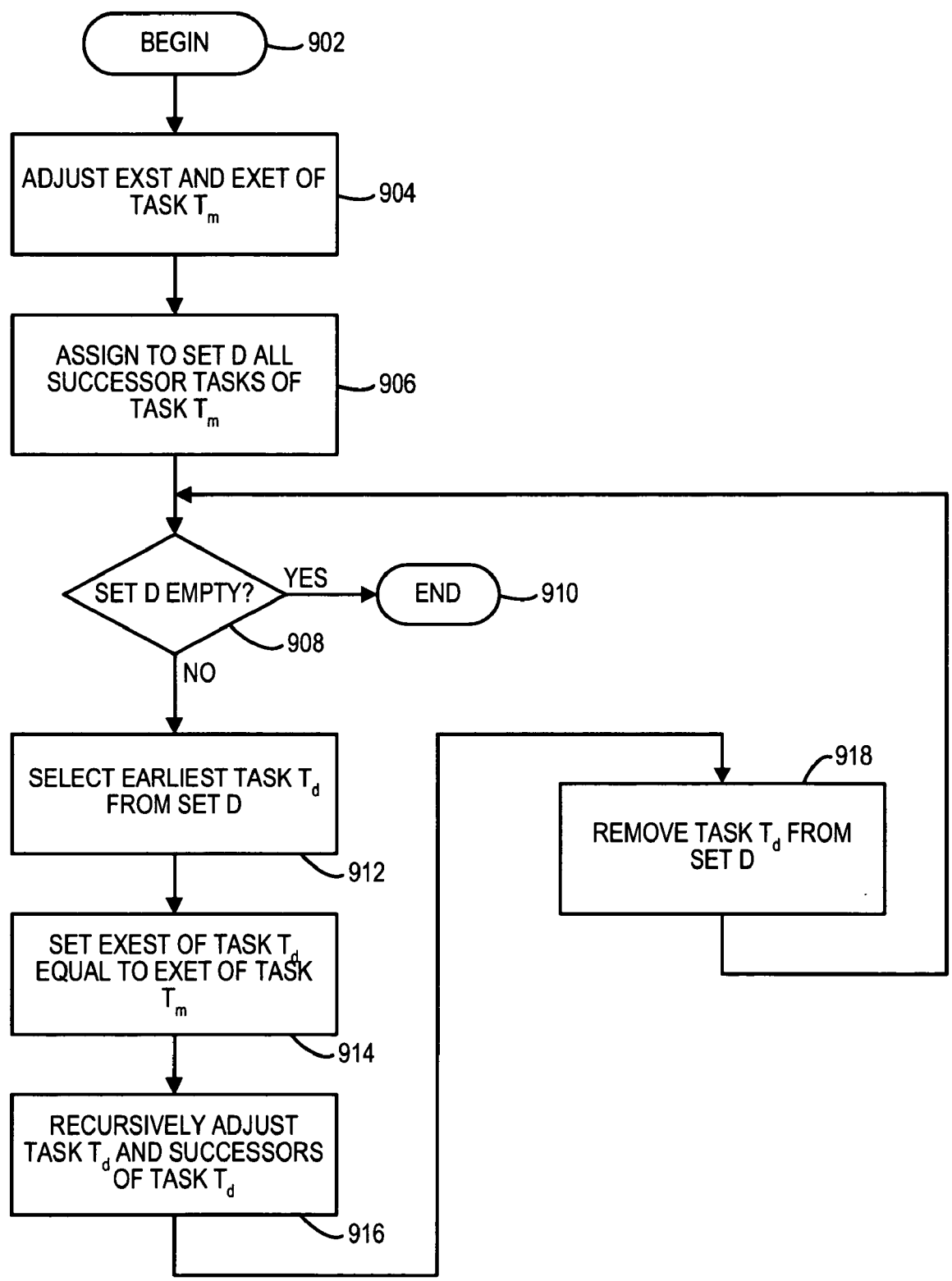
FIG. 9 is a flow chart that illustrates some details of the process of FIG. 4.

At this point the calculation of the stochastic waiting time for task $T_m$ can be completed by fitting to the (now final) minimum, most likely and maximum values of the stochastic waiting time for task $T_m$ a probability density function. For example, a triangular probability density function or beta probability density function may be used. FIG. 10A illustrates, by way of example, fitting of a triangular probability density function to the following set of values: minimum=5, most_likely=9 and maximum=20. As another example, FIG. 10B illustrates fitting of a beta density probability function to the same set of values. Thus the calculated stochastic waiting time for task $T_m$ may be expressed by a probability density function supported in a range between a first end point that represents the minimum waiting time and a second end point that represents the maximum waiting time. The probability density function may exhibit a peak value that represents the most likely waiting time. (It is noted that the stochastic parameters referred to above—e.g., in Table 2—may be expressed in similar fashion.) Referring once more to FIG. 4, step 418 follows step 416. At 418, some attributes of task $T_m$ are adjusted based at least in part on the stochastic waiting time for task $T_m$ which results from 416. FIG. 9 is a flow chart that illustrates details of step 418. The process of FIG. 9 begins at 902 and advances to 904 at which the parameters EXST and EXET of task $T_m$ are adjusted. For example, the EXST of task $T_m$ may be set to EXEST+WT, where WT is the stochastic waiting time for task $T_m$ as calculated at 416 in FIG. 4 and in FIGS. 7A-7C. Also, EXET of task $T_m$ may be set to EXST+LT.

At 906, all successor tasks of task $T_m$ are assigned to set D. Then, a decision block 908 causes the process of FIG. 9 to end (910) if set D is empty.

If it is determined at 908 that set D is not empty, then 912 follows. At 912 the earliest task is selected from set D and is designated task $T_d$. Then, at 914, EXEST of task $T_d$ is set to be equal to EXET of task $T_m$. 916 follows, at which parameters such as EXEST, EXST and EXET are recursively adjusted for task $T_d$ and for the successor tasks of task $T_d$. Then task $T_d$ is removed from set D, as indicated at 918, and the process of FIG. 9 loops back to decision block 908 to determine whether set D is now empty.

Referring again to FIG. 4, 420 follows 418. At 420, task $T_m$ is removed from set A. The process of FIG. 4 then loops back to decision block 406 to determine whether set A is empty (i.e., to determine whether stochastic waiting times have been calculated for all tasks for which such calculations were to be made). If so, the process ends (408). Otherwise, another task is selected from set A and is designated task $T_m$ and the loop 410-420 is performed with respect to the newly selected task.

The stochastic waiting times calculated by the process of FIGS. 4-9 may present a relatively accurate picture of the likely progress of orders and their constituent production tasks through the manufacturing facility. Using such a process may allow for more accurate estimation of lead times and may avoid the overestimation of lead times that is often used in conventional lead time estimation in the complex discrete manufacturing environment. Further, the stochastic waiting times calculated by the process of FIGS. 4-9 may be used as an input to improve the performance of conventional production planning systems and may allow for more accurate prediction of potential bottlenecks due to convergence at one or more manufacturing resources of a number of different orders that are being processed by the manufacturing facility.

It should be understood that the above description and the appended flow charts are not meant to imply a fixed order of performing the process steps. Rather, in alternative embodiments, the process steps may be performed in any order that is practicable.

In some embodiments, the stochastic waiting time calculation described herein may be performed in a computing environment, such as a client computer, that is not a server computer.

Although the system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method of analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the method comprising:
   determining stochastic parameters for each task of said plurality of tasks;
   calculating a stochastic waiting time for at least one selected task of said plurality of tasks, said calculating based at least in part on said stochastic parameters of said tasks; and
   providing the calculated stochastic waiting time as an input to a production planning system;
   wherein the stochastic parameters determined for each task include all of the following:
   (a) priority relative to other tasks;
   (b) processing time;
   (c) expected end time;
   (d) relative slack time;
   (e) task due date;
   (g) expected earliest start time; and
   (h) lead time.

2. A method according to claim 1, wherein the stochastic waiting time for said at least one selected task is calculated based at least in part on:
   (a) the determined stochastic parameters for said at least one selected task; and
   (b) the determined stochastic parameters for each other one of said tasks that potentially conflicts with said at least one selected task.

3. A method according to claim 1, wherein at least some of the manufacturing resources are machine tools.

4. A method according to claim 1, further comprising:
   adjusting a stochastic expected start time parameter for said at least one selected task and a stochastic expected end time parameter for said at least one selected task based at least in part on the calculated stochastic waiting time.

5. A method according to claim 4, further comprising:
   setting a stochastic expected earliest start time parameter of at least one successor task of said at least one selected task in accordance with said adjusted stochastic expected end time parameter fix said at least one selected task.

6. A method of analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the method comprising:
   determining stochastic parameters for each task of said plurality of tasks;
   calculating a stochastic waiting time for at least one selected task of said plurality of tasks, said calculating based at least in part on said stochastic parameters of said tasks; and
   providing the calculated stochastic waiting time as an input to a production planning system;
   wherein the stochastic waiting time for said at least one selected task is calculated based at least in part on:
   (a) the determined stochastic parameters for said at least one selected task; and
   (b) the determined stochastic parameters for each other one of said tasks that potentially conflicts with said at least one selected task;
   wherein said calculating a stochastic waiting time for said at least one selected task includes:

determining a competing task set that includes all tasks that potentially conflict with said at least one selected task;

calculating, based at least in part on said determined stochastic parameters, a stochastic priority parameter for said at least one selected task and for each task included in said competing task set;

initially setting to zero each of a minimum value, a most likely value, and a maximum value of a stochastic waiting time for said at least one selected task;

performing a resource loop with respect to each manufacturing resource allocated to said at least one selected task, said resource loop including:

initially setting to zero each of a minimum, value, a most likely value and a maximum value of a stochastic waiting time for said at least one selected task relative to said each manufacturing resource allocated to said at least one selected task;

performing a competing task loop with respect to each task included in said competing task set, said competing task loop including:

if a maximum value of the stochastic priority parameter of said each task included in said competing task set is greater than a minimum value of the stochastic priority parameter of said at least one selected task for which the stochastic waiting time is being calculated:

calculating an overlap time relative to said each task included in said competing task set and said at least one selected task for which the stochastic waiting time is being calculated; and increasing said maximum value of said stochastic waiting time relative to said each manufacturing resource allocated to said at least one selected task for which the stochastic waiting time is being calculated, said increasing by an amount equal to a product formed by multiplying said overlap time by a likelihood that said each manufacturing resource is to be used by said each task included in said set of competing tasks;

if a most likely value of the stochastic priority parameter of said each task included in said competing task set is greater than a most likely value of the stochastic priority parameter of said at least one selected task for which the stochastic waiting time is being calculated, increasing by said product said most likely value of said stochastic waiting time relative to said each manufacturing resource; and if a minimum value of the stochastic priority parameter of said each task included in said competing task set is greater than a maximum value of the stochastic priority parameter of said at least one selected task for which the stochastic waiting time is being calculated, increasing by said product said minimum value of said stochastic waiting time relative to said each manufacturing resource;

said resource loop further including:

increasing said maximum value of said stochastic waiting time that is being calculated by an amount equal to a product formed by multiplying said maximum value of said stochastic waiting time relative to said each manufacturing resource by a likelihood that said each manufacturing resource is to be used by said at least one selected task for which said stochastic waiting time is being calculated;

increasing said most likely value of said stochastic waiting time that is being calculated by an amount equal to a product formed by multiplying said most likely value of said stochastic waiting time relative to said each manufacturing resource by a likelihood that said each manufacturing resource is to be used by said at least one selected task for which said stochastic waiting time is being calculated; and increasing said minimum value of said stochastic waiting time that is being calculated by an amount equal to a product formed by multiplying said minimum value of said stochastic waiting time relative to said each manufacturing resource by a likelihood that said each manufacturing resource is to be used by said at least one selected task for which said stochastic waiting time is being calculated.

7. A method of analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the method comprising:

determining stochastic parameters for each task of said plurality of tasks;

calculating a stochastic waiting time for at least one selected task of said plurality of tasks, said calculating based at least in part on said stochastic parameters of said tasks; and providing the calculated stochastic waiting time as an input to a production planning system;

wherein the calculated stochastic waiting time for said at least one selected task is expressed as a probability density function supported in a range between a first end point that represents a minimum waiting time and a second end point that represents a maximum waiting time, said probability density function exhibiting a peak value that represents a most likely waiting time.

8. A method according to claim 7, wherein the probability density function is a triangular probability density function.

9. A method according to claim 7, wherein the probability density function is a beta probability density function.

10. A method of analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the method comprising:

determining stochastic parameters for each task of said plurality of tasks; and calculating a stochastic waiting time for at least one selected task of said plurality of tasks, said calculating based at least in part on said stochastic parameters of said tasks; and providing the calculated stochastic waiting time as an input to a production planning system;

wherein each of the stochastic parameters is expressed as a probability density function supported in a range between a first end point that represents a minimum value of the parameter and a second end point that represents a maximum value of the parameter, said probability density function exhibiting a peak value that represents a most likely value of the parameter.

11. A method according to claim 10, wherein the probability density function is a triangular probability density function.

12. A method according to claim 10, wherein the probability density function is a beta probability density function.

13. An apparatus for analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the apparatus comprising:
   a processor; and
   a memory coupled to the processor and storing software instructions, said processor operative with said software instructions to:
      determine stochastic parameters for each task of said plurality of tasks;
      calculate a stochastic waiting time for at least one selected task of said plurality of tasks, said calculating based at least in part on said stochastic parameters of said tasks; and
      provide the calculated stochastic waiting time as an input to a production planning system;
   wherein the stochastic parameters determined for each task include all of the following:
   (a) priority relative to other tasks;
   (b) processing time;
   (c) expected end time;
   (d) relative slack time;
   (e) task due date;
   (g) expected earliest start time; and
   (h) lead time.

14. An apparatus according to claim 13, wherein the stochastic waiting time for said at least one selected task is calculated based at least in part on:
   (a) the determined stochastic parameters for said at least one selected task; and
   (b) the determined stochastic parameters for each other one of said tasks that potentially conflicts with said at least one selected task.

15. An apparatus according to claim 13, wherein the processor is further operative with the software instructions to:
   adjust a stochastic expected start time parameter for said at least one selected task and a stochastic expected end time parameter for said at least one selected task based at least in part on the calculated stochastic waiting time.

16. An apparatus according to claim 15, wherein the processor is further operative with the software instructions to:
   set a stochastic expected earliest start time parameter of at least one successor task of said at least one selected task in accordance with said adjusted stochastic expected end time parameter for said at least one selected task.

17. An apparatus for analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the apparatus comprising:
   a processor; and
   a memory coupled to the processor and storing software instructions, said processor operative with said software instructions to:
      determine stochastic parameters for each task of said plurality of tasks;
      calculate a stochastic waiting time for at least one selected task of said plurality of tasks, said calculating based at least in part on said stochastic parameters of said tasks; and
      provide the calculated stochastic waiting time as an input to a production planning system;
   wherein the stochastic waiting time for said at least one selected task is calculated based at least in part on:
   (a) the determined stochastic parameters for said at least one selected task; and
   (b) the determined stochastic parameters for each other one of said tasks that potentially conflicts with said at least one selected task;
   wherein the processor calculates said stochastic waiting time for said at least one selected task of said plurality of tasks by:
   determining a competing task set that includes all tasks that potentially conflict with said at least one selected task;
   calculating, based at least in part on said determined stochastic parameters, a stochastic priority parameter for said at least one selected task and for each task included in said competing task set;
   initially setting to zero each of a minimum value, a most likely value, and a maximum value of a stochastic waiting time for said at least one selected task;
   performing a resource loop with respect to each manufacturing resource allocated to said at least one selected task, said resource loop including:
      initially setting to zero each of a minimum value, a moat likely value and a maximum value of a stochastic waiting time for said at least one selected task relative to said each manufacturing resource allocated to said at least one selected task;
      performing a competing task loop with respect to each task included in said competing task set, said competing task loop including:
         if a maximum value of the stochastic priority parameter of said each task included in said competing task set is greater than a minimum value of the stochastic priority parameter of said at least one selected task for which the stochastic waiting time is being calculated:
            calculating an overlap time relative to said each task included in said competing task set and said at least one selected task for which the stochastic waiting time is being calculated; and
            increasing said maximum value of said stochastic waiting time relative to said each manufacturing resource allocated to said at least one selected task for which the stochastic waiting time is being calculated, said increasing by an amount equal to a product formed by multiplying said overlap time by a likelihood that said each manufacturing resource is to be used by said each task included in said set of competing tasks;
         if a most likely value of the stochastic priority parameter of said each task included in said competing task set is greater than a most likely value of the stochastic priority parameter of said at least one selected task for which the stochastic waiting time is being calculated, increasing by said product said most likely value of said stochastic waiting time relative to said each manufacturing resource; and
         if a minimum value of the stochastic priority parameter of said each task included in said competing task set is greater than a maximum value of the stochastic priority parameter of said at least one selected task for which the stochastic waiting time is being calculated, increasing by said product said minimum value of said stochastic waiting time relative to said each manufacturing resource;
   said resource loop further including:
      increasing said maximum value of said stochastic waiting time that is being calculated by an amount equal to a product formed by multiplying said maximum value of said stochastic waiting time relative to said each manufacturing resource by a likelihood that said each manufacturing resource is to be used by said at least one selected task for which said stochastic waiting time is being calculated;

increasing said most likely value of said stochastic waiting time that is being calculated by an amount equal to a product formed by multiplying said most likely value of said stochastic waiting time relative to said each manufacturing resource by a likelihood that said each manufacturing resource is to be used by said at least one selected task for which said stochastic waiting time is being calculated; and increasing said minimum value of said stochastic waiting time that is being calculated by an amount equal to a product formed by multiplying said minimum value of said stochastic waiting time relative to said each manufacturing resource by a likelihood that said each manufacturing resource is to be used by said at least one selected task for which said stochastic waiting time is being calculated.

18. An apparatus for analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the apparatus comprising:

a processor; and a memory coupled to the processor and storing software instructions, said processor operative with said software instructions to:

determine stochastic parameters for each task of said plurality of tasks;

calculate a stochastic waiting time for at least one selected task of said plurality of tasks, said calculating based at least in part on said stochastic parameters of said tasks; and provide the calculated stochastic waiting time as an input to a production planning system;

wherein the calculated stochastic waiting time for said at least one selected task is expressed as a probability density function supported in a range between a first end point that represents a minimum waiting time and a second end point that represents a maximum waiting time, said probability density function exhibiting a peak value that represents a most likely waiting time.

19. An apparatus according to claim 18, wherein the probability density function is a triangular probability density function.

20. An apparatus according to claim 18, wherein the probability density function is a beta probability density function.

21. An apparatus for analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the apparatus comprising:

a processor; and a memory coupled to the processor and storing software instructions, said processor operative with said software instructions to:

determine stochastic parameters for each task of said plurality of tasks;

calculate a stochastic waiting time for at least one selected task of said plurality of tasks, said calculating based at least in part on said stochastic parameters of said tasks; and provide the calculated stochastic waiting time as an input to a production planning system;

wherein each of the stochastic parameters is expressed as a probability density function supported in a range between a first end point that represents a minimum value of the parameter and a second end point that represents a maximum value of the parameter, said probability density function exhibiting a peak value that represents a most likely value of the parameter.

22. An apparatus according to claim 21, wherein the probability density function is a triangular probability density function.

23. An apparatus according to claim 21, wherein the probability density function is a beta probability density function.

24. An apparatus for analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the apparatus comprising:

means for determining stochastic parameters for each task of said plurality of tasks;

means for calculating a stochastic waiting time for at least one selected task of said plurality of tasks, said calculating based at least in part on said stochastic parameters of said tasks; and means for providing the calculated stochastic waiting time as an input to a production planning system;

wherein the calculated stochastic waiting time for said at least one selected task is expressed as a probability density function supported in a range between a first end point that represents a minimum waiting time and a second end point that represents a maximum waiting time, said probability density function exhibiting a peak value that represents a most likely waiting time.

25. An apparatus according to claim 24, further comprising:

means for adjusting a stochastic expected start time parameter for said at least one selected task and a stochastic expected end time parameter for said at least one selected task based at least in part on the calculated stochastic waiting time.

26. An apparatus according to claim 25, further comprising:

means for setting a stochastic expected earliest start time parameter of at least one successor task of said at least one selected task in accordance with said adjusted stochastic expected end time parameter for said at least one selected task.

27. An apparatus according to claim 24, wherein the stochastic waiting time for said at least one selected task is calculated based at least in part on:

(a) the determined stochastic parameters for said at least one selected task; and (b) the determined stochastic parameters for each other one of said tasks that potentially conflicts with said at least one selected task.

28. An apparatus for analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the apparatus comprising:

means for determining stochastic parameters for each task of said plurality of tasks;

means for calculating a stochastic waiting time for at least one selected task of said plurality of tasks, said calculating based at least in part on said stochastic parameters of said tasks; and means for providing the calculated stochastic waiting time as an input to a production planning system;

wherein each of the stochastic parameters is expressed as a probability density function supported in a range between a first end point that represents a minimum value of the parameter and a second end point that represents a maximum value of the parameter, said probability density function exhibiting a peak value that represents a most likely value of the parameter.

29. An article of manufacture comprising:

a computer usable medium having computer readable program code means embodied therein for analyzing a manufacturing system, the system including a plurality of manufacturing resources, a set of orders being currently appointed for processing by the manufacturing system, each order of the set of orders requiring performance of at least one task, each task to be performed by at least a respective one of the manufacturing resources, the computer readable program code means in said article of manufacture comprising:

computer readable program code means for determining stochastic parameters for each task of said plurality of tasks;

computer readable program code means for calculating a stochastic waiting time for at least one selected task of said plurality of tasks, said calculating based at least in part on said stochastic parameters of said task; and computer readable program code means for providing the calculated stochastic waiting time as an input to a production planning system;

wherein the calculated stochastic waiting time for said at least one selected task is expressed as a probability density function supported in a range between a first end point that represents a minimum waiting time and a second end point that represents a maximum waiting time, said probability density function exhibiting a peak value that represents a most likely waiting time.

\* \* \* \* \*